United States Patent [19]

Heitmann et al.

[11] Patent Number: 5,062,277

[45] Date of Patent: Nov. 5, 1991

[54] COMBINED OIL HEATER AND LEVEL SENSOR

[75] Inventors: Erric L. Heitmann, Clay; David N. Shaw, Manlius, both of N.Y.

[73] Assignee: Carrier Corporation, Syracuse, N.Y.

[21] Appl. No.: 604,310

[22] Filed: Oct. 29, 1990

[51] Int. Cl.⁵ ............................................. F25B 49/00
[52] U.S. Cl. .................................... 62/193; 62/129;
       62/472; 184/6.4; 184/104.1; 361/22; 417/13
[58] Field of Search ............ 62/192, 193, 228.1,
       62/126, 129, 472; 73/292, 295; 184/6.4, 6.22,
       6.1, 104.1, 108; 417/13, 228, 281; 340/622, 631;
       361/22, 105; 219/322, 323, 324, 330, 333;
       236/21 R, 21 B

[56] References Cited

U.S. PATENT DOCUMENTS

| | | | |
|---|---|---|---|
| 3,411,313 | 11/1968 | Brown et al. | 62/192 |
| 3,744,267 | 7/1973 | Norbeck | 62/193 |
| 3,876,037 | 4/1975 | Rath, Jr. | 184/6.4 |
| 4,004,431 | 1/1977 | Hildreth | 62/193 X |
| 4,066,869 | 1/1978 | Apaloo et al. | 62/472 X |
| 4,090,371 | 5/1978 | Keane | 62/129 |
| 4,720,997 | 1/1988 | Doak et al. | 73/295 |

Primary Examiner—Harry B. Tanner

[57] ABSTRACT

A thermally protected heater element is located in an oil sump such that it is normally located beneath the surface of the oil whereby the oil is heated and acts as a heat sink relative to the heater element. If the oil level drops below the heater element, the thermal protection disables the heater element and the compressor whereby the location of the heater element defines the nominal minimum oil level.

6 Claims, 1 Drawing Sheet

COMBINED OIL HEATER AND LEVEL SENSOR

BACKGROUND OF THE INVENTION

In most refrigeration and air conditioning systems, oil is circulated with the refrigerant as part of the lubrication and cooling process. Circulation is greatest at startup. Because oil interferes with heat transfer in the system, the oil is typically removed from the refrigerant prior to its reaching the heat transfer elements of the system although some oil is still present after separation. The oil separation may take place within the shell of a high side hermetic compressor or may take place downstream of the compressor. Oil viscosity increases with decreasing temperature and refrigerant tends to migrate to the coldest part of the system so that in situations where the compressor/oil separator is exposed to cold temperatures it is often desirable to heat the oil to prevent refrigerant migration to the compressor sump/oil separator, for easier compressor starts and/or to reduce the size of the motor required. Thus, oil is diluted if migration of refrigerant can take place and is entrained in the refrigerant and transported in the system and may thus be removed from the area of need. It has become a standard procedure to monitor the level of the oil in a sump and to shut off the compressor when the oil level drops to a predetermined level. Additionally, the provision of an oil sump heater is a standard option where refrigerant migration is a problem and/or where oil viscosity may become too great.

SUMMARY OF THE INVENTION

A heater element is provided with an integral thermal protection device. In normal operation the heater element is located within the oil which is heated thereby and which acts as a heat sink relative to the heater element. If the oil level drops so that the oil no longer acts as a heat sink, the heater element can overheat and the thermal protection device disables the heater element and the compressor.

It is an object of this invention to provide an integral oil heater and level sensor.

It is another object of this invention to provide an integral oil heater and level sensor that is suitable for use in the shell of a hermetic compressor or in an external oil separator. These objects, and others as will become apparent hereinafter, are accomplished by the present invention.

Basically, a thermally protected heater element is located in an oil sump such that it is normally located beneath the surface of the oil whereby the oil is heated and acts as a heat sink relative to the heater element. If the oil level drops below the heater element, the thermal protection disables the heater element and the compressor whereby the location of the heater element defines the nominal minimum oil level.

BRIEF DESCRIPTION OF THE DRAWINGS

For a fuller understanding of the present invention, reference should now be made to the following detailed description thereof taken in conjunction with the accompanying drawings wherein.

Figure 2:
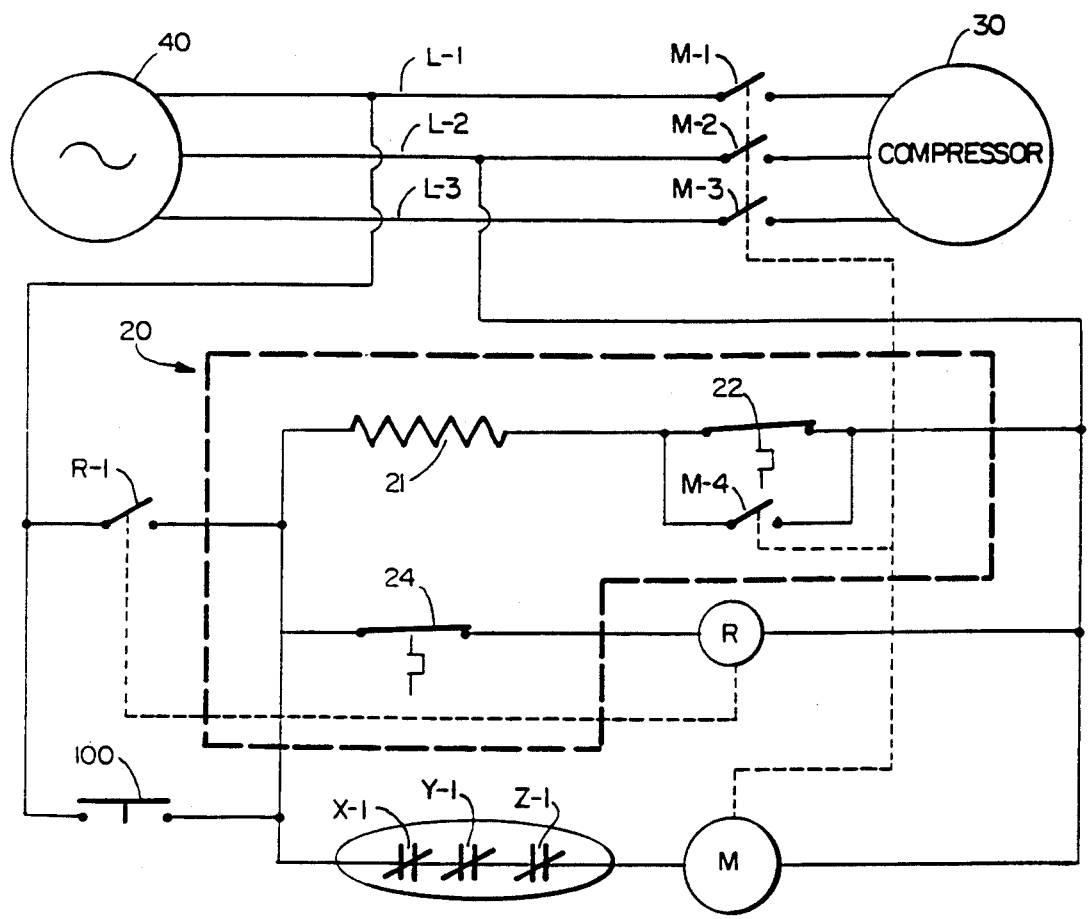

The FIG. 2 is a schematic diagram of the present invention.

DESCRIPTION OF THE PREFERRED EMBODIMENT

Figure 1:
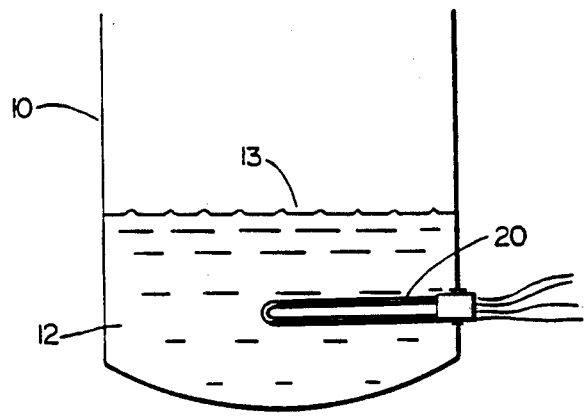
FIG. 1 is a sectional view of an oil sump employing the present invention.

In FIG. 1 the numeral 10 generally designates a housing which may be the shell of a hermetic compressor or an external oil separator in a refrigeration system. An oil sump 12 is normally in the lower portion of housing 10 with the oil level being designated 13. The combined oil heater and level sensor 20 penetrates the shell 10 at a location corresponding to a minimum acceptable height for the oil level 13 so that heater/sensor 20 is normally in oil sump 12 and below oil level 13. Heater/sensor 20 is hermetically sealed to shell 10, as by welding, piping or a threaded connection, to isolate the interior of shell 10, which is part of a refrigeration system, from the atmosphere.

Referring now to FIG. 2, heater/sensor 20 includes a resistance heater element 21 and a normally closed thermostatic device 22 which is in series with the resistance heater element 21 and in parallel with auxiliary contact M-4. The normally closed thermal protection device 24 is in parallel with heater element 21 and in series with relay R. Heater/sensor 20 is in an electrical circuit with compressor 30 and power source 40. Power source 40 is connected to compressor 30 via lines L-1, L-2 and L-3 which contain contacts M-1, M-2 and M-3, respectively, of motor relay M. Motor relay M is in series with the contacts X-1, Y-1 and Z-1 of standard motor protection devices, zone thermostat, etc. and is in parallel with heater element 21 and thermal protection device 24.

In FIG. 2, all of the elements are in their unpowered condition. To activate the system, normally open manually operated switch 100 is momentarily pressed to its closed position thereby completing a circuit between lines L-1 and L-2. Specifically, a first electrical path is established between lines L-1 and L-2 serially including switch 100, thermal protection device 24 and relay R. The powering of relay R causes the closing of contacts R-1 which establishes a parallel path to switch 100 and maintains power upon the opening of switch 100. A second parallel path is established and includes switch 100 and/or contacts R-1, contacts X-1, Y-1 and Z-1 and motor relay M. The powering of relay M causes the closing of contacts M-1, M-2, M-3 and M-4 which provides power to compressor 30 and establishes a parallel path to thermostatic device 22. A third parallel path is established and includes switch 100 and/or contacts R-1, resistance heater 21, thermostatic device 22 and/or contacts M-4.

In normal operation, with contacts R-1 closed, a circuit is completed between lines L-1 and L-2 of power source 40 as long as thermal protection device 24 is closed. Assuming the compressor 30 is operating, contacts X-1, Y-1, Z-1, M-1, M-2, M-3 and M-4 will be closed. Contact M-4 is necessary to override thermostatic device 22 by providing a parallel path so that resistance heater element 21 is powered as long as compressor 30 is powered. So, with heater/sensor 20 located beneath oil level 13 of oil sump 12, the oil in sump 12 is continuously heated and acts as a heat sink with respect to resistance heater element 21. However, if the oil level 13 drops to a point where all or a sufficient amount of heater/sensor 20 is no longer within the oil in oil sump 12, the heat sink effect will be lost/reduced to the extent that resistance heating element 21 causes thermal protection device 24 to open thereby disabling both the resistance heater element 21 and compressor 30. After the compressor 30 has been shut down due to low oil level, additional oil must be added to sump 12 to resubmerge heater/level sensor 20. The added oil should permit resetting of thermal protector 24. A manual reset of switch 100 will be required to re-enable the system. Thus the heater sensor 20 acts as a level sensor when compressor 30 is operating and disables compressor 30 if the oil level 13 drops below a predetermined level. When compressor 30 is not operating such as due to the satisfaction of thermostatic requirements in a zone and the opening of thermostatically controlled contact Z-1, relay M will be in an open circuit and contacts M-1, M-2, M-3 and M-4 will open. A circuit will be established through resistance heater 21 and thermostatic device 22 responsive to the closing of the contacts of thermostatic device 22 in response to the temperature of the oil in sump 12 dropping below a predetermined level. When the oil in sump 12 is heated to another, higher, predetermined level, the contacts of thermostatic device 22 will open. It should be noted that power is supplied/available as long as thermal protector 24 remains closed even though compressor 30 and/or heater 21 are being cycled on and off.

Although a preferred embodiment of the present invention has been illustrated and described, other modifications will occur to those skilled in the art. It is, therefore, intended that the present invention is to be limited only by the scope of the appended claims.

What is claimed is:

1. In an oil sump containing oil for lubricating a drive means, a combined oil heater and liquid level sensor means comprising:
   heater means normally located within said oil in said oil sump for heating said oil;
   normally closed thermal protection means located near said heater means in said sump;
   a source of electric power;
   electrical circuit means connecting said source of electric power to said heater means, said thermal protection means and said drive means whereby said heater means heats said oil in said sump with said oil acting as a heat sink when said heater means is in said oil and connected to said source of electric power and said heater means causes said normally closed thermal protection means to open and cause a break in said circuit means responsive to said heater means being connected to said source of electric power and located above said oil thereby disabling said drive means.

2. The sensor means of claim 1 wherein said drive means includes a compressor means.

3. The sensor means of claim 2 wherein said circuit means includes thermostatically responsive means for operating said compressor means.

4. A combined oil heater and liquid level sensor means comprising:
   heater means adapted to be normally located in an oil sump containing oil at a location within said oil for heating said oil;
   normally closed thermal protection means located near said heater means in said sump;
   electrical circuit means including a source of power connected to a compressor via motor relay contacts and a circuit containing three parallel branches;
   a first one of said branches containing said heater means;
   a second one of said branches containing said thermal protection means and a run relay in series;
   a third one of said branches containing a motor relay for controlling said motor relay contacts;
   contacts of said run relay in series with said circuit; and
   a manual reset means in parallel with said contacts of said run relay and in series with said circuit for connecting said circuit to said source of power when said run relay contacts are open;
   whereby said heater means heats said oil in said sump with said oil acting as a heat sink when said heater means is in said oil and connected to said source of power and said heater means causes said normally closed protection means to open and cause said run relay to open said run relay contacts and thereby open said motor relay contacts and disable said electrical circuit means responsive to said heater means being connected to said source of power and located above said oil.

5. The sensor means of claim 4 wherein said heater means includes thermostatically responsive means for controlling heating of said oil.

6. The sensor means of claim 5 further including means for bypassing said thermostatically responsive means when said compressor is running.

* * * * *